July 28, 1970     D. VERHEIN ET AL     3,521,913
TUBE COUPLING
Filed Aug. 26, 1968             2 Sheets-Sheet 1
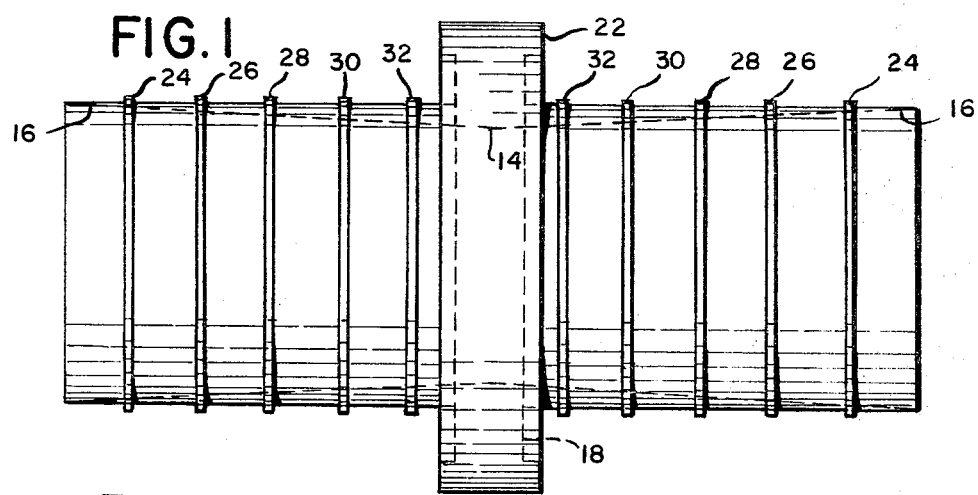
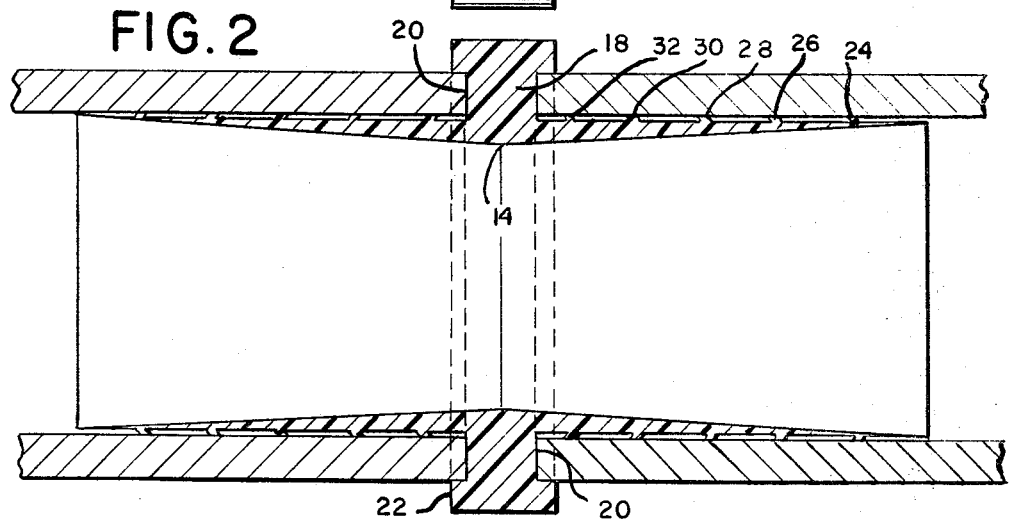
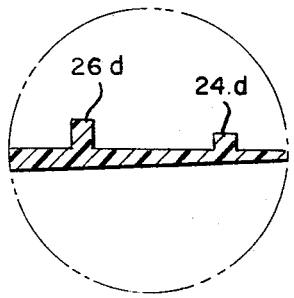
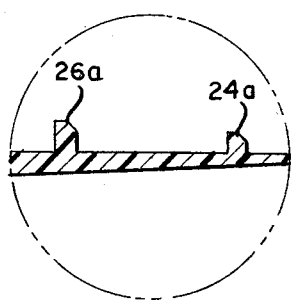
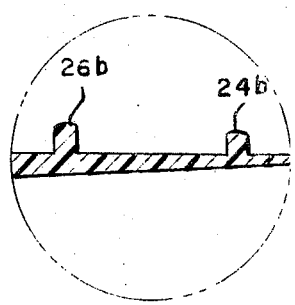
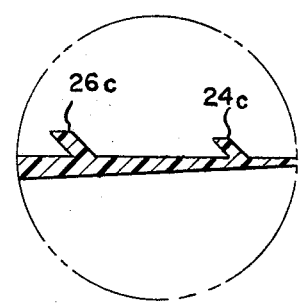
INVENTORS
DONALD VERHEIN
GENE D. VERHEIN
BY    RONALD E. BARRY
ATTORNEY

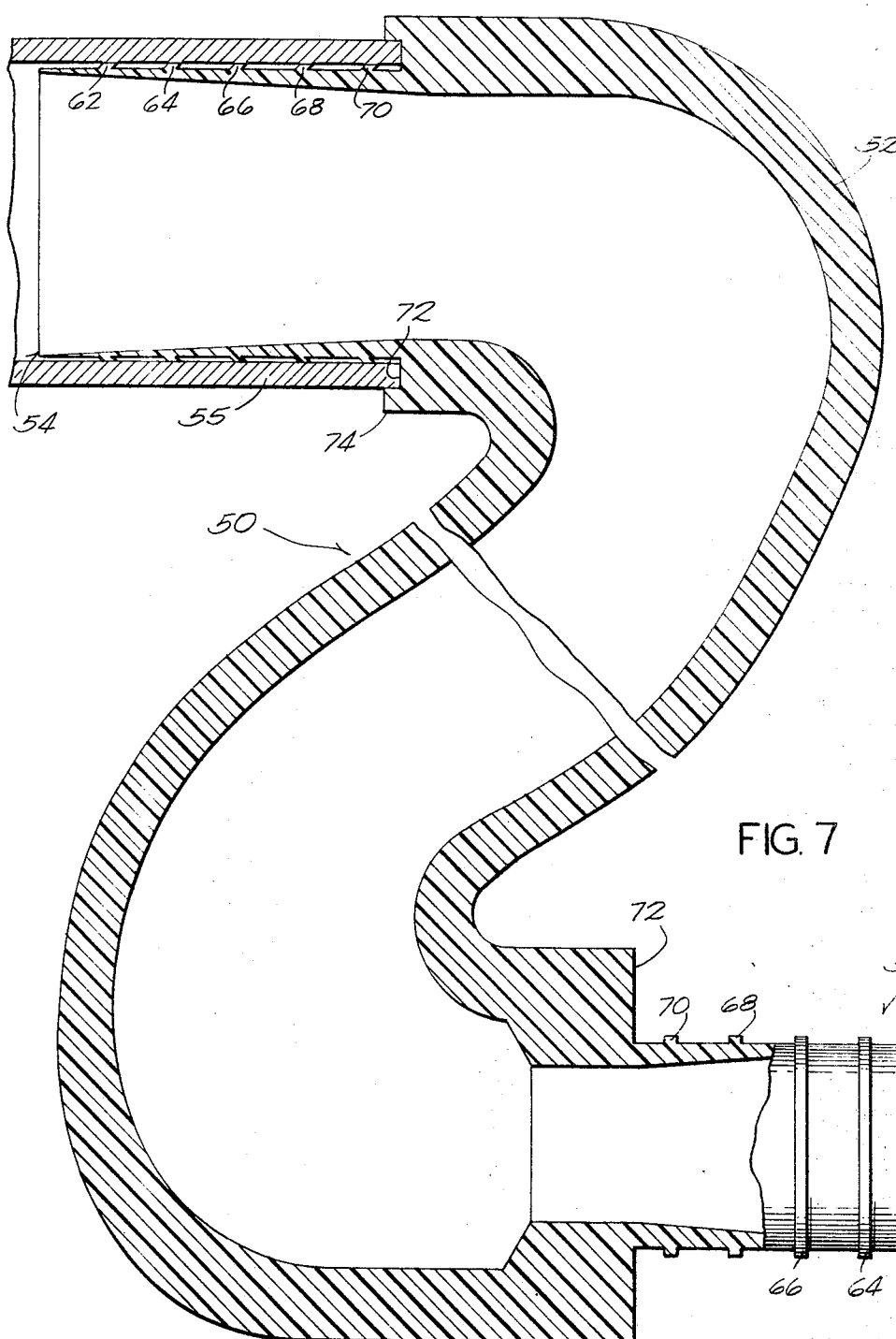

United States Patent Office 3,521,913
Patented July 28, 1970

3,521,913
TUBE COUPLING
Donald Verhein, 2116 N. Peninsula Road, Oconomowoc, Wis. 53066, and Gene D. Verhein, 150 Main St., Wales, Wis. 53183
Continuation-in-part of application Ser. No. 595,519, Nov. 18, 1966. This application Aug. 26, 1968, Ser. No. 755,106
Int. Cl. F16l 17/00, 27/10
U.S. Cl. 285—109        8 Claims

ABSTRACT OF THE DISCLOSURE

A tube coupling comprising a tubular plastic housing with a radially extending flange, the internal diameter of the housing increasing in diameter from the center outwardly toward its ends and the external surface of the housing having a number of annular ridges.

RELATED APPLICATION

This application is a continuation-in-part application of our copending application Ser. No. 595,519, filed Nov. 18, 1966, entitled, "Tube Coupling," and now abandoned.

BACKGROUND OF THE INVENTION

This invention relates to an improved device to hollow shaped sections such as pipes or conduits and more particularly to a unitary type flexible coupling for interconnecting unthreaded type sections.

Conduits which are used to convey liquids under pressure are cut to length at the site and threaded for connection to the next conduit by means of a threaded coupling member. Efforts have been made to use plastic material to interconnect such conduits but for the most part have been unsuccessful due to seal failures as well as cost to manufacture.

SUMMARY OF THE INVENTION

The invention disclosed herein includes an internal pipe coupling having a cylindrical tubular housing with an internal diameter which increases gradually outwardly toward the ends of the housing and a radially outwardly extending flange on the outside surface of the housing with a number of annular ridges which increase in height from the ends of the housing toward the flange. This type of coupling is inserted into the open ends of a pair of pipes until the ends of the pipes seat against the flange with the ridges sealingly engaging the internal surfaces of the pipes.

Other objects and advantages will become more readily apparent from the following detailed description when read in connection with the accompanying drawings, in which:

FIG. 1 is a side view of one form of the present invention.

FIG. 2 is a sectional view of the coupling inserted into a conduit section.

FIG. 3 is an enlarged sectional view of the ridges shown in FIGS. 1 and 2.

FIG. 4 is an enlarged sectional view of a modified form of the ridges.

FIG. 5 is an enlarged sectional view of a second form of the ridges.

FIG. 6 is an enlarged sectional view of a third form of the ridges.

FIG. 7 is a view of a modified coupling for connecting two pipes located at position remote from each other.

Referring to the drawings, FIGS. 1 and 2, one embodiment of the invention is shown in the form of a coupling 10 having a hollow cylindrical housing 12 of substantially constant outside dimensions. The internal diameter of the housing increases gradually from the center 14 outward to the ends 16 of the housing which is effect produces a tapered tubular housing.

A flange 18 is formed as an integral part of the housing and extends radially outward from the center of the housing. The radial surfaces 20 of the flange act as a secondary seal when the ends of the conduit sections are brought into abutting engagement with them. To complete the seal with the end of the conduit sections, an annular ring 22 is formed on the outer periphery of the flange and extends longitudinally in both directions from the flange. The distance of the annular ring from the outer surface of the housing is made slightly larger than the thickness of the conduit sections on which the housing is to be mounted so that it will engage the outer surface of the conduit. As an example, a standard one-inch diameter conduit section would have a wall thickness of approximately .113 inch. The coupling would, therefore, have an outer diameter of approximately 1.5 inches with the ring spaced from the housing .115 inch.

A seal is produced between the coupling and inside of the conduit sections by a number of annular ridges 24, 26, 28, 30 and 32 located at spaced intervals along the outer surface of the housing. The ridges may take the form of a square ridge 24 (FIG. 3), a bevel top ridge 24a (FIG. 4), a radius ridge 24b (FIG. 5) or an angled ridge 24c (FIG. 6) with the ridges increasing in height from the outer ends toward the center. The outer ridge 24 should be approximately one-half the height of the next ridge 26, and ridge 26 one-half the height of the next ridge 28.

The entire coupling may be formed in a single operation if molded from a semirigid plastic such as urethane or polyvinyl chloride. However, any similar plastic may be used if it is capable of withstanding the chemical composition and pressure of the fluid being transferred through the conduit section. It has been found that using a urethane plastic the coupling is capable of withstanding pressures up to 4,000 p.s.i.

All of the ridges are molded as an integral part of the outer surface of the coupling and are, therefore, flexible since the housing is formed from a flexible plastic material. The outer diameter of the ridges is slightly greater than the inner diameter of the hollow section so that the ridges will be bent back when the coupling is inserted into the hollow section. The ridges may be molded in a spiral type ridge on the outer surface of the housing but at least one ridge should be continuous about the outer surface to assure a complete seal about the housing.

In FIGS. 4, 5 and 6, modified ridges are shown having beveled outer surfaces 24a, round outer surfaces 24b and angled leading edges 24c. All of these ridges have an angular relationship to the housing to provide ease in assembly and difficulty in disassembly.

In the embodiment shown in FIG. 7, a coupling 50 is shown which includes an elongate tubular conduit 52 having tapered tubular housings 54 formed at each end of the conduit. The internal diameter of the housing 54 increases in diameter from the end of the tubular housing 52 outwardly to the end 56 of the housing 54. A seal is produced between the tubular housing 54 and the inside of the conduit section 55 by a number of annular ridges 62, 64, 66, 68 and 70 located at spaced intervals along the outer surface of the housing 54. The ridges may take the same forms as described in connection with FIGS. 3, 4, 5 and 6 with the ridges increasing in height from the outer ends toward the radial surface 72 at the end of the tubular conduit 52.

A secondary seal is formed between the coupling and the conduit section by means of the radial surface 72 provided on the end of the conduit 52 which engages the end of the conduit section 55. An annular ring 74 may be formed on the outer periphery of the radial surface 72 to engage the outer surface of the conduit section. The tubular housing 54 at each end of the conduit 52 is inserted into conduit sections located at remote positions until the end of the conduit section is seated against the radial surface 72.

Couplings of the type disclosed herein can be used with any type of conduits, such as straight line, elbows, tees or joints of any nature.

What is claimed is:

1. An internal coupling for interconnecting unthreaded conduit sections comprising,
    a tubular housing formed of a single piece of resilient plastic material, the internal diameter of said housing increasing gradually from the center of said housing outwardly toward the ends of said housing,
    a radially extending flange integral with and centrally located on said housing,
    said flange presenting radial engagement surfaces for said conduit sections,
    a number of annular ridges on the outer periphery of said housing on either side of said flange, said ridges increasing in height gradually from the outer end of said housing toward said flange,
    whereby on insertion of the ends of said tubular housing into the conduit sections the conduit sections will seat on the engagement surfaces of said flange and said ridges will sealingly engage the inside surfaces of said conduit sections.

2. An internal coupling according to claim 1 including an annular ring integral with the outer periphery of the flange to engage the outer peripheral surface of said conduit section.

3. An internal coupling according to claim 1 wherein said ridges are arranged in spaced relation on the outer periphery of said housing.

4. An internal coupling according to claim 1 wherein said ridges are arranged in a continuous spiral and at least one of the ridges is circumferentially continuous.

5. An internal coupling for interconnecting unthreaded conduit sections comprising
    a flexible conduit having a radially outwardly extending surface at each end of said conduit,
    a tubular housing at each end of said conduit, each housing having an internal diameter which increases gradually from the end of said conduit outwardly toward the end of said housing,
    and a number of annular ridges on the outer surface of each of said housings, said ridges increasing in height gradually from the outer end of said housing toward said radial surface.

6. An internal coupling according to claim 5 including an annular ring integral with the outer periphery of said radial surface to engage the outer peripheral surface of the conduit section.

7. An internal coupling according to claim 5 wherein said ridges are arranged in spaced relation on the outer periphery of said housing.

8. An internal coupling according to claim 5 wherein said ridges are arranged in a continuous spiral and at least one of the ridges is circumferentially continuous.

References Cited

UNITED STATES PATENTS

| | | | |
|---|---|---|---|
| 2,416,657 | 2/1947 | Trevaskis | 285—109 |
| 2,470,359 | 5/1949 | McLean | 285—109 |
| 2,726,103 | 12/1955 | Slattery | 285—110 |
| 2,871,034 | 1/1959 | Wiltse | 285—109 |
| 3,235,291 | 2/1966 | Jacoby | 285—109 |
| 3,269,754 | 8/1966 | Bertling et al. | 285—109 |
| 3,360,283 | 12/1967 | Guthrie | 285—110 |

FOREIGN PATENTS

| | | |
|---|---|---|
| 1,151,990 | 7/1963 | Germany. |
| 627,278 | 8/1949 | Great Britain. |

THOMAS F. CALLAGHAN, Primary Examiner

U.S. Cl. X.R.

285—110, 398